United States Patent

[11] 3,622,852

[72] Inventor George H. Myers
 St. Joseph, Mich.
[21] Appl. No. 15,992
[22] Filed Mar. 3, 1970
[45] Patented Nov. 23, 1971
[73] Assignee Whirlpool Corporation
 Benton Harbor, Mich.

[54] ELECTRONIC SPEED CONTROL CIRCUIT FOR DIRECT DRIVE AUTOMATIC WASHER
 3 Claims, 18 Drawing Figs.

[52] U.S. Cl. .................................................. 318/328, 318/341
[51] Int. Cl. .................................................. H02p 5/16
[50] Field of Search ........................................ 318/325– 328, 341, 345

[56] References Cited

UNITED STATES PATENTS

| | | | |
|---|---|---|---|
| 3,441,826 | 4/1969 | Mason.......................... | 318/327 |
| 3,458,792 | 7/1969 | Jabbar.......................... | 318/341 X |

FOREIGN PATENTS

| | | | |
|---|---|---|---|
| 2,005,150 | 12/1969 | France ........................ | 318/328 |

Primary Examiner—Oris L. Rader
Assistant Examiner—Robert J. Hickey
Attorneys—James S. Nettleton, Thomas E. Turcotte, Burton H. Baker, Donald W. Thomas, Gene A. Heth, Franklin C. Harter, Anthony Niewyk, Robert L. Judd and Hill, Sherman, Meroni, Gross and Simpson ABSTRACT: A motor speed control circuit in which the frequency of the tachometer feedback pulses is doubled, integrated and applied to control the charging circuit of the firing angle control circuit for varying the frequency of energizing pulses applied to the motor.

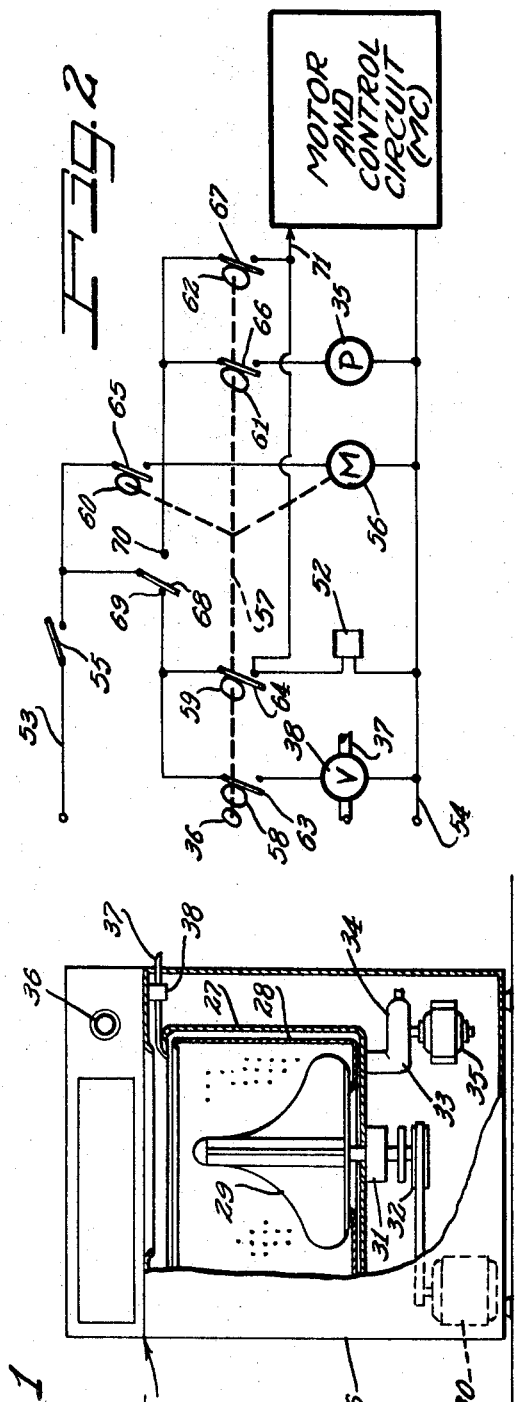

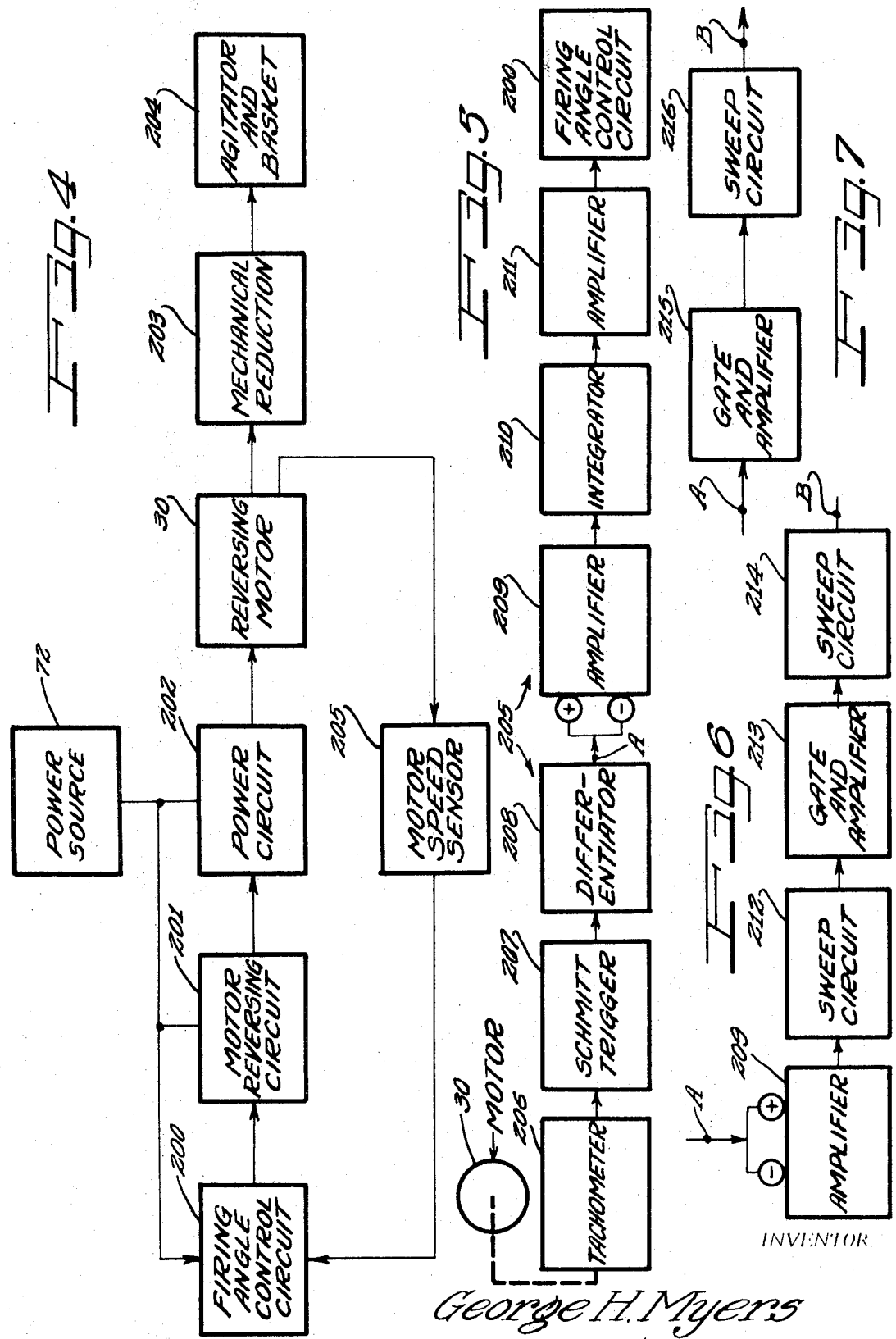

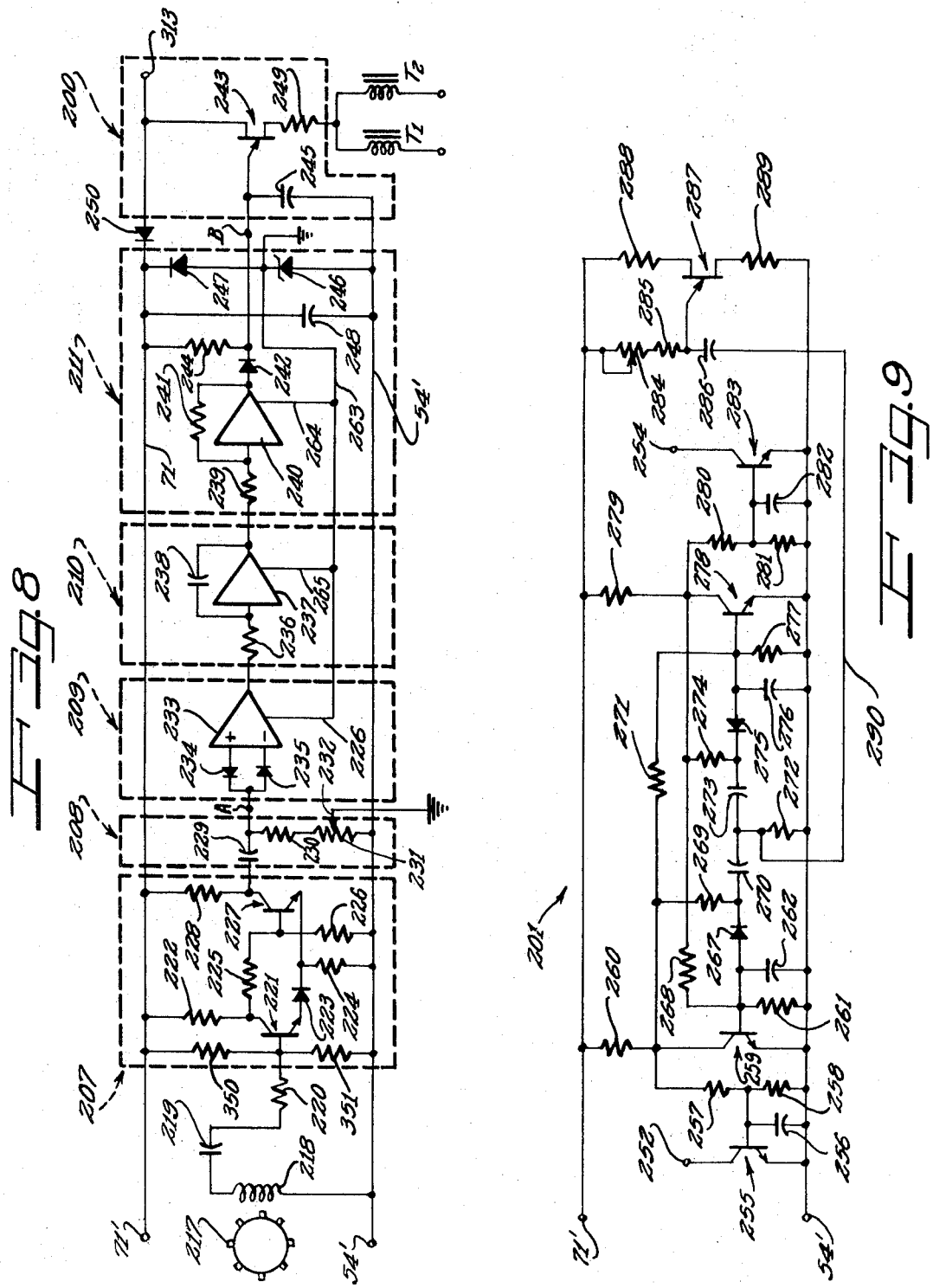

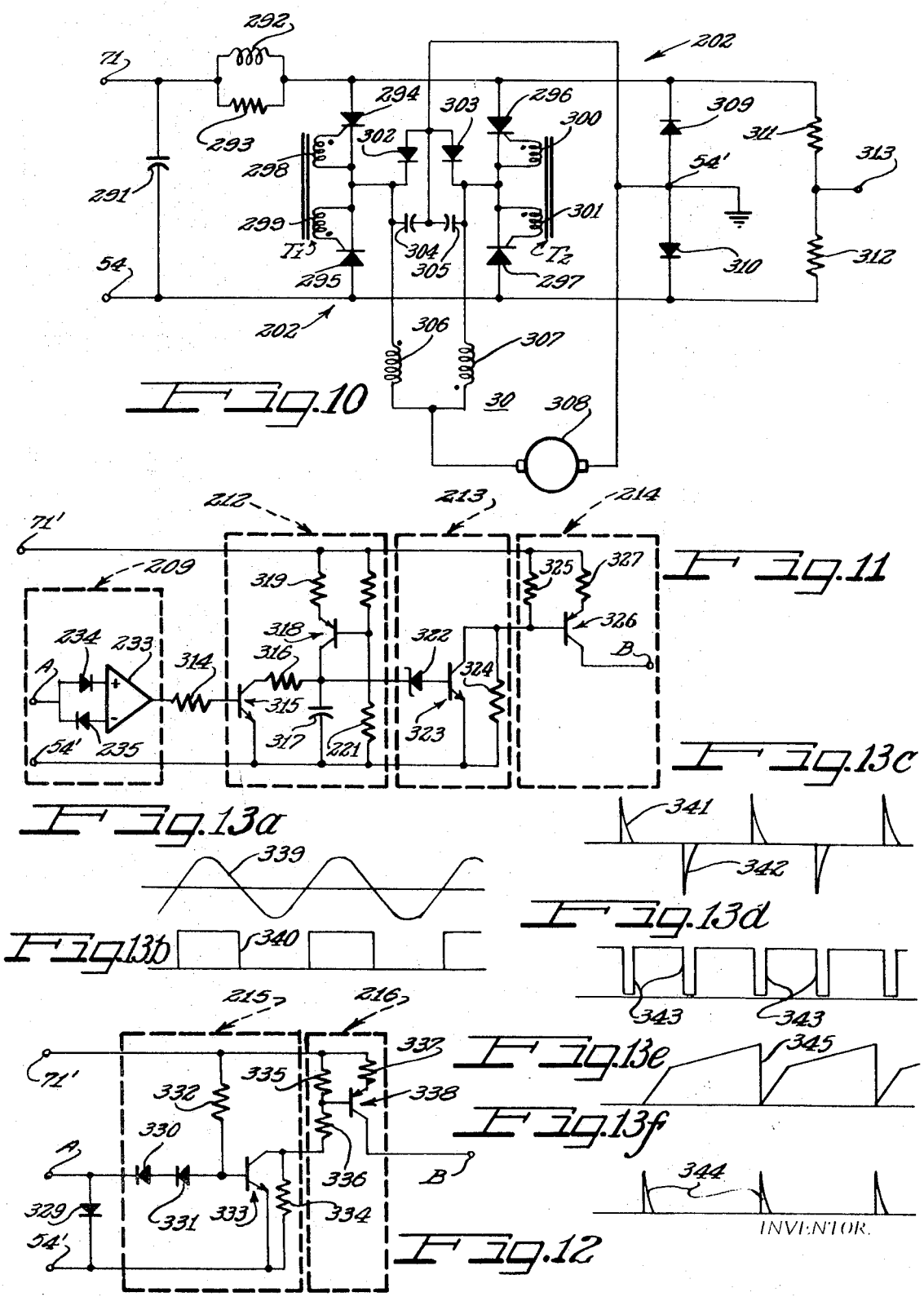

3,622,852

ELECTRONIC SPEED CONTROL CIRCUIT FOR DIRECT DRIVE AUTOMATIC WASHER

BACKGROUND OF THE INVENTION

1. Field of the Invention

This invention relates generally to motor control circuits and more specifically to laundry appliances wherein an oscillatable wash means is driven by a reversible motor energized by control circuit means including a power circuit coupled with a reversing circuit for reversing the motor cyclically or for operating the motor unidirectionally and, is particularly concerned with motor speed regulation by a firing control circuit which receives a motor speed feedback signal from a motor speed sensing circuit.

2. Description of the Prior Art

There are currently two types of domestic automatic laundry machines in undesigned use, those having a vertical axis and usually including an oscillatable agitation means separate from a spin basket and those having a substantially horizontal axis wherein the clothes are agitated by tumbling.

In U.S. Pat. No. 3,369,381 owned by the assignee of the present invention there is disclosed an oscillatable wash means driven by a reversible motor and either cyclically oscillated or unidirectionally rotated. The motor is energized through a power circuit electrically with a reversing circuit and the voltage supplied to the motor is maintained at a constant level with the assistance of a firing control circuit. The apparatus includes sequential control means having a switching means for conditioning an electronic drive control in accordance with a preset program to permit either cyclic operation or continuous rotation. One construction utilizes a tachometer for generating a signal which is rectified and filtered and employed as a feedback signal to the firing angle control circuit.

SUMMARY OF THE INVENTION

According to the invention, a reversible motor is energized by a power circuit under the control of a firing angle control circuit and a motor reversing circuit. The speed of the motor is detected by a tachometer, the output pulses of which are counted to control the operation of the firing angle control circuit and accordingly the electrical angle at which the silicon control rectifiers of the power circuit are rendered conductive.

I have discovered that the reversible motor can be provided with better stability by employing a control circuit which includes a motor speed sensing circuit which counts the number of pulses produced by a tachometer to control the electrical angle at which the silicon controlled rectifiers of the power circuit are rendered conductive to energize the motor, and although it is known in the art to convert the output of a tachometer into a signal for operating a speed indicating device, it is a primary object of the present invention to utilize the output of a tachometer to control the electrical angle at which the silicon control rectifiers of the power circuit are fired to energize the reversible motor.

BRIEF DESCRIPTION OF THE DRAWINGS

Other objects and features of the invention, its organization, construction and operation, will be readily apparent from the following description taken in conjunction with the accompanying drawings, in which:

FIG. 1 is a schematic front view of a laundry machine incorporating the present invention and partially broken away to illustrate interior components thereof;

FIG. 2 is a schematic diagram of an illustrative timer control circuit for the laundry machine shown in FIG. 1;

FIG. 3 is a chart illustrating graphically the various machine cycle timer switch positions for the circuit illustrated in FIG. 2;

FIG. 4 is a schematic and blocked diagram of a control circuit according to the present invention;

FIG. 5 is a schematic and blocked diagram of an embodiment of a motor speed sensing circuit which may be employed in the apparatus illustrated in FIG. 4;

FIG. 6 is a block and schematic diagram of a modification of the apparatus illustrated in FIG. 5;

FIG. 7 is a block and schematic diagram of another modification of the apparatus illustrated in FIG. 5;

FIG. 8 is a schematic circuit diagram of the apparatus illustrated in FIG. 5;

FIG. 9 is a schematic circuit diagram of the motor reversing circuit illustrated in FIG. 4;

FIG. 10 is a schematic circuit diagram of the power circuit and reversing motor circuit illustrated in FIG. 4;

FIG. 11 is a schematic circuit diagram of the apparatus illustrated in FIG. 6;

FIG. 12 is a schematic circuit diagram of the apparatus illustrated in FIG. 7; and FIGS. 13a–13f are graphical illustrations of wave forms found at various points in the control circuit of the present invention.

The drawings carry reference numerals in FIGS. 1–3 which correspond to the reference numerals of the aforementioned U.S. Pat. No. 3,369,381 and reference may be taken to that patent for a thorough discussion of the oscillatory and unidirectional modes of rotation of the reversible motor.

DESCRIPTION OF THE PREFERRED EMBODIMENTS

In FIG. 1 of the drawings there is diagrammatically illustrated a vertical axis washing machine 25 which includes a cabinet 26, a stationary tub 27, rotatable clothes basket 28 (centrifuging mechanism) and an agitator 29 (agitation mechanism). An electric drive motor 30 is selectively connected through a suitable clutch mechanism 31 to the basket 28 and the agitator 29. Interposed between the motor 30 and the clutch mechanism 31 is a fixed gear reduction box or belt reduction unit 32 which may be employed in the event the speed or torque characteristics of the motor require such apparatus. It is to be understood that there is thus a direct drive from the motor 30 to either the basket 28 or the agitator 29 depending upon the position of clutch mechanism 31 which is described in particular detail in the aforementioned patent.

The washing machine 25 also includes a drain 33 connected to the tub 27 and a drain pump 34 operated by an associated pump drive motor 35. An automatic cycling mechanism, including timer motor 56, for sequentially performing the desired operations of the washer is initially actuated by a timer control knob 36. Washing fluid is supplied to the washing machine 25 through a supply pipe 37 which is controlled by a suitable solenoid operated shutoff valve 38.

The specific clutch mechanism 31 and the mechanical support and arrangement of the basket 28 and the agitator 29 form no part of the present invention, but may, by way of example, be of the type which is illustrated and described by Glen A. Severance, Clifton A. Cobb and William F. Robandt in their U.S. Pat. No. 3,279,223, which is assigned to the same assignee as the present invention. Another suitable clutch mechanism is also illustrated and described in the aforementioned Crane et al. U.S. Pat. No. 3,369,381.

A timer control circuit for the washing machine 25 is illustrated schematically in FIG. 2 of the drawings. The main washing machine motor 30 and its associated control circuit, represented by the block MC are arranged to be energized through power supply conductors 53 and 54 from a conventional 115 volt, 60 cycle alternating current source. A master switch 55 under the control of axially movable knob 36 is preferably interposed in the electric supply line. The cycling operation is under the control of a timer motor 56 which drives a cam shaft 57 having a plurality of cams 58, 59, 60, 61 and 62 thereon. These cams 58–62 are arranged to close associated switches 63–67, respectively, for predetermined periods at predetermined times during the cycle of operation, these periods and times being indicated by the chart shown in FIG. 3. The actual timing of the cycle does not start until the tub 27 has been filled with water to its desired washing level. The water level is controlled by a float switch arm 68 which engages a contact 69 in its low water level position and engages a contact 70 when the water level within the tub 27 has reached its desired height for washing.

As is common practice, the main timer control knob 36 has limited axial movement as well as rotational movement. Depression of the knob 36 in an axial direction closes the master switch 55 while rotational movement sets the desired length of the washing period. The shutoff valve 38 in the water fill line 37 is energized through cam switch 63 and float switch 68. Thus, when the control knob 36 is moved to start a cycle of operation, master switch 55 is closed and cam 58 is advanced to close switch 63. Shutoff valve 38 is now energized and, hence, open and water begins to flow through supply pipe 37. Water continues to flow into tub 27 through conduit 37 until the float switch arm 68 moves from contact 69 to contact 70. At a period of time longer that that necessary to fill the tub 27 cam 58 causes switch 63 to open. Movement of switch arms 68 to contact 70 actually starts the timing cycle since timer motor 56 is arranged to be energized through switch arm 68 and contact 70. Since the timer motor 56 must continue to operate except during periods when the tub 27 is being filled with water, the timer motor 56 must have an additional energization circuit. This is accomplished by the switch 65 under the control of the cam 60 which operates a circuit in parallel with the float switch 68 in accordance with a profile of the cam 60.

At the time the float switch arm 68 engages the timer motor 56, the cam switch 67 is closed to energize the main motor 30 and its associated control circuit MC, by the way of the conductors 71 and 54.

A movable clutch plate (not shown) of the clutch mechanism 31 which connects the clothes basket 28 to the dry shaft 44 is controlled by the solenoid 52 of FIG. 2. This solenoid 52 is arranged to be energized thorough the cam switch 64. The pump 35 which causes withdrawal of water from the tub 27 is energized through the cam switch 66.

From the consideration of the simplified and illustrative chart in FIG. 3, it will be seen that after the main motor 30 is started through switch 67, the agitator 29 will be driven by the main motor 30 for a predetermined period of time. It will then be deenergized and the cam switch 66 will energize the pump 35 to withdraw water from the tub 27. The cam switch 64 will then be closed so that when the water has reached its low level position, the switch arm 68 will move back against the contact 69 and the clutch solenoid 52 will be energized to connect the basket 28 to the dry shaft 44. Simultaneously, the main motor 30 and its control circuit MC will be energized through conductors 54 and 71, and the basket 28 and the agitator 29 will be rotated together by the main motor 30 during a centrifugal extraction or spin. At the end of the centrifugal extraction or spin period, the switch 65 opens to deenergize the timer motor 56 after the cam switch 63 has closed to reopen the fill valve 38. This action causes refilling of the tub 27 with water for the rinse cycle. When the tub has been filled, the switch arm 68 again closes against the contact 70 to energize the timer motor 56. The timer then advances the cam shaft 57 to close the main motor cam switch 67 and an operation similar to the previous wash and spin cycle then follows with the exception that the rinse cycle is shorter than the wash cycle. At the end of the final spin cycle the timer motor 56 leaves all of its associated cam switches 63, 64, 65, 66 and 67 in an open position. The timer motor 56 also controls switches 107, 129, 130, 137, 190, 191 and 196 in other portions of the control circuit, an explanation of which is not necessary for an understanding of the present invention, such description however, being available by reference to the aforementioned U.S. Pat. No. 3,369,381.

The details of the above-described cycling operation have been only briefly described, since the apparatus and its operation is quite conventional in substance and well understood by those skilled in the art.

Turning now to FIG. 4, a control circuit for use with the washing machine is seen to comprise the reversible motor 30 controllably energized by a firing angle control circuit 200 through a motor reversing circuit 201 and connected to a power source 72 through a power circuit 202. The reversible motor 30 is coupled through a mechanical reduction unit 203 to an agitator and basket combination 204. The reversible motor 30 is further connected to a motor speed sensor 205, the output of which is utilized to control the operation of the firing angle control circuit 200.

The motor speed sensor 205 is more particularly set forth in FIG. 5 as comprising a tachometer 206 coupled to the motor 30 for producing a signal in accordance with he speed of rotation of the motor 30. The tachometer 206 is employed to operate a Schmitt trigger circuit 207, the output of which is a square wave pulse train. The square wave pulse train is converted to a series of alternate polarity pulses by a differentiator 208 and fed to an amplifier 209 to provide a second pulse train of a single polarity. The pulses of the second pulse train are utilized to establish a DC level by means of an integrator 210 and fed through an amplifier 211 to control the operation of the firing angle control circuit 200.

More particularly, and with reference to FIGS. 8, 9 and 13a–13, the tachometer 206 comprises a tachometer wheel 217 which is rotated in synchronism with the drive motor 30 to induce electrical signals 339 FIG. 13a in coil 218. The electrical signal 339 is coupled by way of a capacitor 219 and a resistor 220 to the Schmitt trigger circuit 207.

The Schmitt trigger circuit 207 comprises a transistor 221 having its base connected to resistor 220 for receiving the signal 339 and to terminals 71' and 54' by way of resistors 350 and 351, respectively, a collector connected by way of a resistor 222 to terminal 71' and an emitter connected by way of a diode 223 and a resistor 224 to terminal 54'. The terminals 71' and 54', as indicated, re derived from the conductors 71 and 54. The collector of transistor 221 is further connected by way of a resistor 225 to the base of a second transistor 227, the emitter of which is also connected by way of the resistor 224 to terminal 54'. The base of transistor 227 is also connected to terminal 54' by way of a resistor 226. The collector of the transistor 227 is connected to terminal 71' by way of a resistor 228.

When the input voltage (signal 239) to the Schmitt trigger is below a predetermined level the output voltage of the Schmitt trigger will be constant and at a low level, transistor 227 being conductive. However, when the input voltage to the Schmitt trigger exceeds the predetermined level, transistor 221 will become conductive to reverse bias the base emitter circuit of transistor 227 causing the output voltage thereof to change rapidly from the low value to a constant level high value (pulse 340, FIG. 13b). Therefore, when the pulses from the tachometer 206 are fed to the Schmitt trigger, the output will be a square wave pulse train whose frequency is indicative of the speed of the motor 30.

The square wave pulse train is fed to a differentiator 208 which comprises a capacitor 229 connected to the collector electrode of transistor 227 and a pair of resistors 230 and 231 connected between capacitor 229 and terminal 54'. The differentiator 208 effects the creation of a pulse at each leading and trailing edge of each square pulse fed thereto. The leading edge of the pulse will be transformed into a positive pulse 341 (FIG. 13c) and the trailing edge of the pulse will be transformed into a negative pulse 342.

The pulses 341 and 342 are fed to an amplifier circuit 209 comprising an amplifier 233 and diodes 234 and 235 as positive and negative inputs thereto. The amplifier 233 is responsive to both positive and negative inputs to provide negative-going square wave pulses at its output, as shown in FIG. 13d. Therefore, the number of pulses at the output of the amplifier 233 will be double that of the number of pulses generated by the tachometer 206. These pulses are now fed to an integrator 210 which comprises an input resistance 236, an amplifier 237 and a feedback capacitor 238. The integrator 210 provides a DC level indicative of the number of pulses fed thereto in such a manner that a greater number of pulses results in a lower DC level. Therefore, it a great number of negative pulses are provided at the output of amplifier 233, the DC level will be lower than if only a few pulses are provided.

The DC signal from the integrator 210 is fed through an amplifier 211 comprising an input resistor 239, an amplifier 240 and a feedback resistor 241, and through a diode 242 to the firing angle control circuit 200.

The firing angle control circuit 200 comprises a unijunction transistor 243 having a resistor 244 and a capacitor 245 connecting the emitter electrode thereof between terminals 71' and 54', respectively. The unijunction transistor 243 delivers a pulse to the motor reversing circuit 201 when a predetermined voltage level is developed at the emitter electrode thereof. The time required for developing such a voltage level to fire the unijunction transistor 243 to deliver the required pulse is determined by that circuitry which controls the charge developed across the capacitor 245.

The time required for developing the required charge across the capacitor 245 is, of course, determined by the DC level provided at the output of the amplifier 211 which, in turn, is determined by the number of pulses provided by the differentiator 208 to the amplifier 209. Therefore, for a given speed setting, the greater the speed of the motor 30, the greater the number of pulses provided and the lower the DC level to increase the time required for charging the capacitor 245 sufficiently to trigger the unijunction transistor 243 into conduction.

The conduction path for the unijunction transistor 243 includes a resistor 249 and either of two windings 251 or 253 of transformers T1 and T2, respectively. Windings 251 and 253 are connected by way of terminals 252 and 254 to the collectors of transistors 255 and 283, respectively of the motor reversing circuit 201.

As illustrated in FIG. 9, the supply potential on terminal 71' is connected through a resistor 260 to the collector of a transistor 259 and through a resistor 279 to the collector of a transistor 278, transistors 259 and 278 having their emitters connected to terminal 54'. The collector of the transistor 259 is connected to the base of the transistor 278 by way of a resistor 271. Similarly, the collector of the transistor 278 is connected to the base of the transistor 259 by way of a resistor 268. The base of the transistor 259 is connected to the terminal 54' by way of a resistor 261 and the base of the transistor 278 is connected to the terminal 54' by way of a resistor 277. A capacitor 262 is connected in shunt relation with the resistor 261 and a capacitor 276 is connected in shunt relation with the resistor 277. A pair of diodes 267 and 275 have their anodes connected to the bases of the transistors 259 and 278, respectively, and a pair of coupling capacitors 270 and 273 are serially connected between the cathodes of the diodes 267 and 275. A resistor 269 connects the collector of the transistor 259 to the cathode of the diode 267 and a resistor 274 connects the collector of the transistor 278 to the cathode of the diode 275. A resistor 272 connects the junction between the coupling capacitors 270 and 273 to the terminal 54'.

The just-described circuit is well known in the art as a flip-flop circuit and is triggered by the application of a voltage pulse across the resistor 272. This triggering voltage is derived from a relaxation oscillator circuit which comprises a unijunction transistor 287 having its bases connected to the terminal 71' and 54' by way of a pair of resistors 288 and 289, respectively. The emitter electrode of the transistor 287 is connected to the terminal 71' by way of a variable resistor 284 and a fixed resistor 285. The emitter electrode is also connected to the terminal 54' by way of a capacitor 286 and the resistor 272 of the flip-flop circuit over the conductor 290.

The relaxation oscillator operates in a manner similar to the firing control circuit in that the frequency of conduction of the transistor 287 is dependent upon the time required to charge the capacitor 286 to a firing potential.

When a voltage pulse is developed across the resistor 272, the conducting one of the transistors 259, 278 will be rendered nonconductive and the other transistor will be rendered conductive to switch the firing pulses from one of the primary windings 251, 253 to the other.

Attention is invited that the collector of the transistor 259 is also connected to the base of the transistor 255 by way of a resistor 257. The base of the transistor 255 is further connected to the terminal 54' by way of the parallel connected capacitor 256 and resistor 258. Likewise, the collector of the transistor 278 is connected to the base of the transistor 283 by way of a resistor 280. The base of the transistor 283 is also connected to the terminal 54' by way of the parallel connected components 281, 282. As the transistor 259, for example, becomes nonconductive, its collector rises toward the potential of terminal 71' causing a forward biasing of the transistor 255 for completing a circuit from the terminal 71' through the unijunction transistor 243, the resistor 249, the winding 251 of transformer T1 and the transistor 255 to the terminal 54'. Likewise in the alternate condition of the flip-flop circuit, the transistor 283 provides a complete circuit for the primary winding 253 of the transformer T2.

Referring to FIG. 10 it can be seen that each of the transformers T1 and T2 comprise a pair of secondary windings 298, 299 and 300, 301 respectively. These windings are connected to the gate and cathode electrodes of the silicon controlled rectifiers 294–297. The silicon controlled rectifiers 294 and 296 form positive cycle conducting elements having their anodes connected to the conductor 71" while the silicon control rectifiers 295 and 297 form negative cycle conducting elements having their anodes connected to conductor 54. The cathodes of the silicon control rectifiers 294, 295 are connected together and to one winding 206 of the drive motor 30. Similarly, the cathodes of the silicon control rectifiers 296, 297 are connected together and to an opposite polarity winding 207 of the drive motor 30. A pair of diodes 302 and 303 and a pair of capacitors 304 and 305 provide transient suppression within the power circuit.

When the silicon controlled rectifier 294 is triggered on by way of a pulse induced at winding 298, pulses from 71" are supplied to the motor winding 306, causing current flow through the armature circuit 308 which is returned at the anodes of diodes 309 and 310. By the same token, when the silicon controlled rectifier 295 is rendered conductive by a pulse induced in transformer winding 299, pulses from 54 will be provided to the winding 306 as positive current flow. In a like manner, silicon controlled rectifiers 296 and 297 provide current flow for the motor winding 307.

Attention is invited that the voltage supply for the firing angle control circuit 200 is derived from the midpoint of a pair of resistors 311 and 312 at terminal 313 and regulated by a pair of zener diodes 246 and 247, and smoothed by a capacitor 248.

The firing of the silicon controlled rectifiers 294–297 is dependent upon the frequency of operation of the relaxation oscillator and the flip-flop circuit to provide completed circuits for the primary windings of the transformers T1 and T2, while the conduction angle or the point during each half cycle of the AC power source at which the primary windings of the transformers are energized is dependent upon the number of pulses per unit of time produced by the tachometer 206. The capacitor 245 will always be discharged at the zero crossing point of the line voltage in that the base 1 of the unijunction transistor 243 is connected to the terminal 313 whereby its voltage will change with line voltage. Two charging paths are provided for the capacitor 245. First of these paths is from the line 71' through the resistor 244. The second path is from the amplifier 211. The capacitor will charge up rapidly to the value provided by the amplifier 211 and will then charge more slowly through the resistor 244. This creates a ramp and pedestal charging pattern for the capacitor 245 as illustrated in FIG. 13e . When the firing voltage of the unijunction transistor 243 is reached, the capacitor 245 will discharge through the unijunction transistor 243 to create pulses 344 (FIG. 13f) for transformers T1 and T2. When a large number of pulses are generated by the tachometer 206, the firing of the unijunction transistor 243 will be delayed to a later point in the line cycle than when few pulses are generated to effect a spreading of time between successive pulses 344. The speed of the drive motor 30 is therefore brought back to its desired value.

FIGS. 6 and 7 illustrate in block form alternate embodiments of the motor speed sensing circuit of FIG. 5 and may be interposed in FIG. 5 between points A and B.

Referring first to FIG. 6, and to FIG. 11 which is a detailed showing of the apparatus of FIG. 6, the circuit comprises a dual polarity input amplifier circuit 209 including an amplifier 233 and a pair of diodes 234 and 235 connected to the point A. The amplifier 233 provides a rectangular pulse train to a sweep circuit 212 which comprises a transistor 315 having an emitter connected to terminal 54' and a collector connected through a resistor 316, a second transistor 318 and a resistor 319 to terminal 71'. A capacitor 317 connects the collector of the transistor 318 to terminal 54' and a pair of resistors 320 and 321 connect the base of the transistor 318 to the terminal 71' and 54', respectively. The pulses are fed to the sweep circuit 212 by way of a resistor 314 which is connected to the base of the transistor 315. When no pulse is present at the base of the transistor 315, the transistor 318 is conditioned to charge the capacitor 317 in a linear fashion in that the transistor 318 acts as a constant current source. However, when a pulse appears at the base of the transistor 315, the transistor becomes conductive to discharge the capacitor 317 very rapidly. The resulting voltage therefore has a sawtooth waveform. The frequency of the sawtooth is double that of the number of pulses created by the tachometer 206. These sawtooth pulses are fed to a gate and amplifier circuit 213. The gate and amplifier circuit 213 comprises a zener diode 322 connected to the capacitor 317 and the base of a transistor 323. The transistor 323 has its emitter connected to the terminal 54' and its collector connected by way of a resistor 325 of the sweep circuit 214 to the terminal 71'. The collector of the transistor 323 is also connected to terminal 54' by way of the resistor 324. Whenever the output of the sweep circuit 212 reaches a voltage level greater than the zener conduction voltage of the zener diode 322, current will be conducted to the base of the transistor 323 to gate the transistor 323 to a conductive condition. The gating of circuit 213 affects the operation of the circuit 214, a sweep circuit comprising a transistor 326 having its emitter connected to the terminal 71' by way of a resistor 327, its collector connected to the terminal 54' by way of capacitor 245 and its base connected to the collector of the transistor 323. Conduction of the transistor 323 therefore increases the base to emitter voltage of the transistor 326 causing it to conduct heavily and charge capacitor 245 rapidly. The amount of time that transistor 326 conducts heavily is dependent upon the height of the sawtooth pulses created by the sweep circuit 212. Therefore, when a great number of pulses are generated by the tachometer 206, the capacitor 245 will charge more slowly than when a fewer number of pulses are generated. Accordingly, the silicon control rectifiers of the power circuit will be gated on at a later time when a greater number of pulses are present, thereby slowing down the motor 30 until equilibrium is established.

Referring to FIG. 7 and the more detailed showing thereof in FIG. 12, a third embodiment of the motor speed sensor circuit is illustrated as comprising a gate and amplifier circuit 215 and a sweep circuit 216. The gate and amplifier circuit 215 comprises a transistor 333 having a base connected to the terminal 71' by way of a resistor 332, an emitter connected to the terminal 54' and a collector connected to the terminal 71' by way of a pair of resistors 335, 336. A resistor 334 connects the collector of the transistor 333 to the terminal 54'. The sweep circuit 216 comprises a transistor 338 having an emitter connected to the terminal 71' by way of a resistor 337, a collector connected to the terminal 54' by way of capacitor 245 and a base connected to the collector of the transistor 333 by way of the resistor 336 and to the terminal 71' by way of the resistor 335. A pair of diodes 330, 331 aid in establishing a threshold at the input to transistor 333 while a diode 329 is conductive to shunt positive pulses to the terminal 54'. Therefore, charge is prevented from being built up at capacitor 229 of the differentiator 208 and positive pulses of the differentiator are conducted through the diode 329 to the terminal 54'. When the negative pulses of the differentiator 208 exceed the sum of the offset voltages of the diodes 330, 331, the transistor 333 will be rendered nonconductive and will therefore remove some of the base drive of the transistor 338. The transistor 338 will then become less conductive to slow the charging rate of the capacitor 245. Therefore, when a great number of pulses are created by the tachometer 206, the capacitor 245 will charge more slowly and will cause the silicon control rectifiers of the power circuit to be fired at a later angle of conduction of the line, thereby slowing the speed of the motor 30.

It will now be appreciated that a great number of different and various embodiments may be constructed in accordance with the principles described herein, however, only those presently preferred have been described herein. It is therefore to be understood that although various minor structural modifications might be suggested by those versed in the art, I wish to embody within the scope of the patent hereon all such modifications as reasonably and properly come within the scope of my contribution to the art.

The embodiments of the invention in which an exclusive property or privilege is claimed are defined as follows:

1. In a motor control circuit having a firing angle control circuit for operating a controlled conduction circuit to energize a motor with time-spaced energization pulses, a feedback loop between the motor and the firing angle control circuit for adjusting the spacing of the energizing pulses to control the speed of the motor comprising a tachometer connected to the motor and operable to generate a signal having a frequency corresponding to motor speed, a trigger circuit operated by said signal to generate a first pulse train of the same frequency, and means connected between said trigger circuit and the firing angle control circuit for controlling the operation of the firing angle control circuit in accordance with the frequency of said first pulse train, including means for producing a second pulse train in response to said first pulse train and at a frequency that is a multiple of a frequency of said first pulse train and means for converting said second pulse train into a control signal for controlling the operation of said firing angle control circuit, including a capacitor, means for charging said capacitor including a transistor connected in series with said capacitor and an electrical supply, and means connected between said transistor and said means for producing said second pulse train for controlling the rate of conduction of said transistor and the charging of said capacitor, comprising a sawtooth generator operable to generate sawtooth pulses in response to the pulses of said second pulse train.

2. In a motor control circuit according to claim 1, wherein said sawtooth generator comprises another capacitor, a constant current source normally operative to change said other capacitor, and means operable in response to the pulses of said second pulse train to discharge said other capacitor.

3. In a motor control circuit according to claim 1, wherein the means for controlling the rate of conduction comprises means operable in response to said sawtooth pulses to gate said transistor into conduction.

* * * * *